(12) United States Patent
Morris et al.

(10) Patent No.: US 11,840,781 B2
(45) Date of Patent: Dec. 12, 2023

(54) SYSTEMS AND METHODS FOR THERMALLY BONDING FIBER

(71) Applicants: Kirk S. Morris, Waukegan, IL (US); Dylan M. Morris, Waukegan, IL (US)

(72) Inventors: Kirk S. Morris, Waukegan, IL (US); Dylan M. Morris, Waukegan, IL (US)

(*) Notice: Subject to any disclaimer, the term of this patent is extended or adjusted under 35 U.S.C. 154(b) by 581 days.

(21) Appl. No.: 16/934,869

(22) Filed: Jul. 21, 2020

(65) Prior Publication Data
US 2022/0025559 A1    Jan. 27, 2022

(51) Int. Cl.
*B29C 35/04*      (2006.01)
*B29C 35/16*      (2006.01)
(Continued)

(52) U.S. Cl.
CPC ............ *D04H 1/558* (2013.01); *B01D 39/04* (2013.01); *B01D 39/163* (2013.01);
(Continued)

(58) Field of Classification Search
CPC .... B01D 39/02; B01D 39/04; B01D 39/1607; B01D 39/1623; B01D 39/163; B01D 39/2041; B01D 2201/186; B01D 2239/0216; B01D 2239/0233; B01D 2239/0636; B01D 2239/064; B01D 2239/10; B01D 2239/1233; B01J 19/30; B29C 35/002; B29C 35/02; B29C 35/0288; B29C 35/04; B29C 35/045; B29C 35/16; B29C 2035/046; B29C 2035/1616; B29C 66/69; B29C 66/9121; B29C 66/91216; B29C 66/9141; B29C 66/95; B29C 66/96; B29C 66/961; B29C 66/97; C02F 3/103; D01G 99/00; D04D 7/04; D04D 7/06; D04H 1/005; D04H 1/43825; D04H 1/43828; D04H 1/43835; D04H 1/54; D04H 1/541; D04H 1/5412; D04H 1/5418;
(Continued)

(56) References Cited

U.S. PATENT DOCUMENTS 4,404,166 A * 9/1983 Wiech, Jr. ............. B22F 3/1021
                                                                                                         419/36
4,574,182 A * 3/1986 Pescatore .................. F27B 9/12
                                                                                                           219/390
(Continued)

*Primary Examiner* — Michael A Tolin
(74) *Attorney, Agent, or Firm* — WOMBLE BOND DICKINSON (US) LLP

(57) ABSTRACT

A system for thermally bonding nonwoven fibers of assemblages of nonwoven fibers loosely held together may include a processing duct including an inlet end, an outlet end, and an intermediate portion extending between the inlet end and the outlet end. The system also may include one or more heat inlets located in the intermediate portion and configured to facilitate introduction of heat and air flow into the intermediate portion. The system further may include an inlet air feed at the inlet end and configured to separate the assemblages upon entry into the inlet end and propel the assemblages into the intermediate portion. The system also may include one or more heating devices configured to heat the assemblages as the assemblages are conveyed toward the outlet end to form processed assemblages, each of the processed assemblages including at least some nonwoven fibers adhered to one another.

14 Claims, 3 Drawing Sheets

(51) Int. Cl.
| | |
|---|---|
| *F27B 9/10* | (2006.01) |
| *F27B 9/12* | (2006.01) |
| *F27B 9/20* | (2006.01) |
| *F27B 9/36* | (2006.01) |
| *F27B 9/40* | (2006.01) |
| *B01D 39/04* | (2006.01) |
| *B01D 39/16* | (2006.01) |
| *B01D 39/20* | (2006.01) |
| *C02F 3/10* | (2023.01) |
| *D04H 1/54* | (2012.01) |
| *D04H 1/558* | (2012.01) |
| *B29C 65/00* | (2006.01) |
| *D04D 7/06* | (2006.01) |

(52) U.S. Cl.
CPC ........ *B01D 39/2041* (2013.01); *B29C 35/045* (2013.01); *B29C 35/16* (2013.01); *B29C 66/69* (2013.01); *B29C 66/9121* (2013.01); *B29C 66/9141* (2013.01); *C02F 3/103* (2013.01); *D04H 1/54* (2013.01); *F27B 9/10* (2013.01); *F27B 9/20* (2013.01); *F27B 9/36* (2013.01); *F27B 9/40* (2013.01); *B01D 2239/0216* (2013.01); *B01D 2239/064* (2013.01); *B01D 2239/0636* (2013.01); *B01D 2239/10* (2013.01); *D04D 7/06* (2013.01); *F27B 2009/124* (2013.01)

(58) Field of Classification Search
CPC .......... D04H 1/558; D04H 1/732; D04H 1/76; F27B 7/10; F27B 7/12; F27B 7/32; F27B 7/3205; F27B 7/34; F27B 7/36; F27B 7/362; F27B 7/38; F27B 7/383; F27B 7/42; F27B 2007/3211; F27B 2007/3217; F27B 2007/365; F27B 2007/367; F27B 9/06; F27B 9/08; F27B 9/10; F27B 9/12; F27B 9/20; F27B 9/3005; F27B 9/3011; F27B 9/36; F27B 9/38; F27B 9/40; F27B 2009/124; F27B 2009/3016; F27B 2009/382; Y02W 10/10
See application file for complete search history.

(56) References Cited

U.S. PATENT DOCUMENTS

| | | | | |
|---|---|---|---|---|
| 5,587,239 | A * | 12/1996 | Ueba | C02F 3/085 |
| | | | | 428/377 |
| 5,827,012 | A * | 10/1998 | Circeo, Jr. | E01C 21/02 |
| | | | | 405/258.1 |
| 6,409,834 | B1 * | 6/2002 | Frati | B27N 1/0254 |
| | | | | 118/313 |

* cited by examiner

SYSTEMS AND METHODS FOR THERMALLY BONDING FIBER

TECHNICAL FIELD

The present disclosure relates to systems and methods for thermally bonding fiber, and more particularly, to systems and methods for thermally bonding fiber of assemblages including a plurality of nonwoven fibers. Other aspects also are described.

BACKGROUND

Filters are often used to capture or separate particulates and other substances from fluids such as air, water, oils, and various other liquids. Many filters include a filter medium such as a woven or nonwoven material with openings or passages designed/sized to capture or separate certain sizes of particulates and other substances from the fluids. Various types of filters further are used in many different consumer and industrial filtration applications, such as for filtering drinking water, swimming pools, aquaculture, and for wastewater recycling, oil separation, and other applications. The filter media used typically is selected/designed to provide a high filtering efficiency to prevent fine particulates from passing through the filter medium, while achieving a low pressure drop across the filter medium during the useful life of the filter medium. Filter media are also often designed to provide an extended useful life that does not require frequent cleaning or replacement. However, these design goals can tend to be inversely related. For example, a filter medium having a high filtering efficiency often accumulates particulates more quickly, which often results in increasing the pressure drop across the filter medium, leading to clogging and/or blockages.

Nonwoven materials have been used to provide a filter medium exhibiting a relatively high efficiency and a relatively low pressure drop. For example, a substantially two-dimensional layer or sheet of nonwoven filter medium may be used to filter fluid by passing the fluid into one side of the filter medium, through the filter medium, and out the other side of the filter medium. With such a filter medium, however, the particulates can tend to build up and form a filter cake on the filter medium, resulting in reducing the effectiveness of the filtration and increasing the pressure drop across the filter medium. In response to such an increase in pressure drop, it may be necessary to increase the output of a pump associated with the fluid system being filtered to maintain a desired fluid flow in the system. In addition, because the filter medium is nonwoven, over time fibers of the filter medium tend to migrate, or reposition and/or separate, reducing the effectiveness and longevity of the filter medium.

Accordingly, it can be seen that a need exists for providing filter media that may address the foregoing and other related, and unrelated, issues and/or problems.

SUMMARY

In view of the foregoing, in one aspect, the present disclosure is directed to a system for forming filtering assemblages, each of the assemblages initially including a plurality of nonwoven fibers loosely held together in the assemblages, and with fibers being subjected to thermal bonding so as to result in at least some of the nonwoven fibers being bonded to one another. The assemblages may be used as a filter medium for filters to capture or separate particulates and other substances from a fluid, with the thermal bonding of the fibers thereof helping to substantially reduce or minimize fiber migration during use of the assemblages as a filter medium.

In some embodiments, the system according to the present disclosure will include a processing duct including an inlet end configured to receive unprocessed assemblages, and an outlet end configured for exit of processed assemblages from the processing duct. An intermediate portion of the processing duct extends longitudinally between the inlet end and the outlet end, with one or more heat inlets located along the intermediate portion and configured to facilitate introduction of heat and air flow into the intermediate portion. The system also includes an inlet air feed that can be arranged at the inlet end of the processing duct, the inlet air feed configured to apply air at a sufficient velocity/pressure to separate the plurality of unprocessed assemblages from one another upon entry into the processing duct and propel the unprocessed assemblages through the inlet end and into the intermediate portion of the processing duct. One or more heating devices are coupled to the heat inlets of the processing duct, each of the heating devices configured to generate and direct a flow of heated air into the intermediate portion of the processing duct, wherein the unprocessed assemblages are heated as they are conveyed through the intermediate portion of the processing duct and toward the outlet end of the processing duct to form the plurality of processed assemblages to roll and tumble as they move through the processing duct.

Each of the processed assemblages can include the plurality of nonwoven fibers, wherein at least some of the plurality of nonwoven fibers are adhered to one another, and with the assemblages formed with a desired shape or configuration. The system also can include a plurality of supports coupled to the processing duct and configured to facilitate adjustment of a pitch angle of at least a portion of the processing duct relative to level. In some embodiments of the system, the one or more heating devices are configured to direct heated air through their respective inlet air feeds and into the processing duct at a flow rate, temperature, and a pitch angle that can be selected and adjustable for processing assemblages having different physical constructions and characteristics, such as different mass, different geometries, or different material compositions.

According to still another aspect, the present disclosure is also generally directed to a method for thermally bonding a series of nonwoven fibers loosely held together so as to define a plurality of assemblages. The method includes introducing the assemblages into an inlet end of a processing duct and as the assemblages move through the inlet end of the processing duct, at least partially separating the assemblages from one another. The method also can include conveying the assemblages from the inlet end of the processing duct along a path through the processing duct and toward an outlet end of the processing duct, and heating the assemblages as the assemblages are conveyed along their path toward the outlet end of the processing duct to form a plurality of processed assemblages, sufficient to bond or adhere at least a portion of the plurality of nonwoven fibers of each assemblage to one another. The method also can include cooling the plurality of processed assemblages, wherein at least a selected portion of the plurality of nonwoven fibers remain adhered to one another following cooling. In some embodiments, the method also includes introducing the heated air into the processing duct at a flow rate and a temperature, and adjusting at least one of the inlet air feed, the flow rate, the temperature, or a pitch angle of at least a portion of the processing duct relative to level to adjust a level of adherence of the portion of the plurality of nonwoven fibers to one another.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Figure 1:
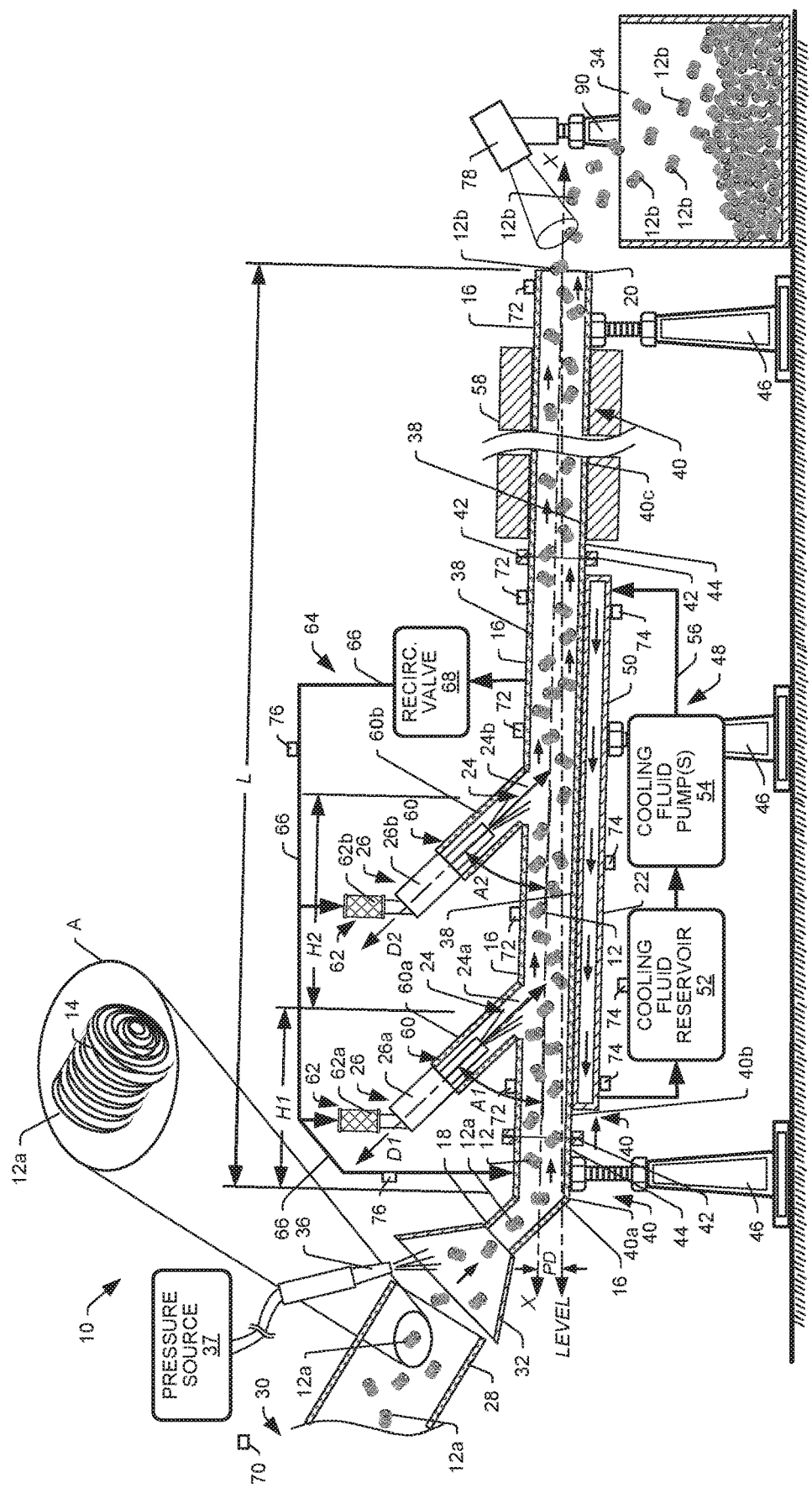
FIG. 1 is a partial section side view of an example embodiment of a system for thermally bonding nonwoven fibers of assemblages according to an aspect of the present disclosure.

As generally shown in FIG. 1, the present disclosure is directed to a system 10 for thermally bonding at least a portion of a plurality of nonwoven fibers of a plurality of assemblages 12, each including a plurality of fibers 14 loosely held together in the assemblage 12. In some embodiments, at least some of the fibers 14 may be nonwoven fibers. A plurality of the assemblages 12 may be used as a filter medium for capturing and/or separating particulates and other substances from fluid passing through a plurality of the assemblages 12. For example, a series of assemblages can be used as a filter medium for a water filtration system, such as for use as a filter for a swimming pool or other fluid system.

The inset A of FIG. 1 shows an example assemblage 12a prior to being processed by the system 10 to thermally bond at least a portion of the fibers 14 to one another, and thus, the fibers 14 the of the pre-processed assemblage 12a shown in inset A are not adhered to one another and are only loosely held together in the assemblage 12a. After being processed by the system 10, at least a portion of fibers 14 of the processed assemblages 12b are thermally bonded to one another and thus are adhered to one another. The assemblages further can have various configurations and sizes, including having substantially spherical or cylindrical configurations such as shown in the figures, as well as various other configurations depending on the application or use therefor.

In some embodiments the preprocessed assemblages 12a may be formed from one or more raw slivers, including at least two different fibers having different deniers or linear weight, colors, and/or translucencies. In assemblages 12a including more than one sliver, the slivers may be nonwoven slivers and/or may have different dimensions. For example, the slivers of an assemblage 12a may have different lengths, thicknesses, widths, and/or deniers. The slivers may have a length ranging from about two inches to about twenty-four inches, a width ranging from about one inch to about six inches, and a thickness ranging from about one-sixty-fourth of an inch of about one-half of an inch. Other sliver lengths, widths, and thicknesses are contemplated.

The fibers 14 of the slivers can have different diameters and can be formed from different types of materials. In one embodiment, one or more of the fibers 14 may have a diameter of about 41 micrometers. The two or more different types of fibers 14 may be polymeric and at least one of the fiber types may be a bi-component fiber, for example, having a fiber core and an exterior fiber covering, with the fiber core and the fiber covering having different material properties, such as different melting temperatures and/or different chemical compositions.

In some embodiments, about 45% by weight of the sliver may be bi-component fibers, and the bi-component fibers may have a component with melting temperature ranging from about 50 degrees Celsius to about 300 degrees Celsius (e.g., from about 90 degrees Celsius to about 220 degrees Celsius). The fibers 14 may be synthetic staple fibers having various deniers or densities. In some embodiments, the staple fibers are polymeric. For example, the fibers 14 may include polyethylene terephthalate (PET), polyethylene (PE), or other thermoplastics. Other types of the fibers 14 may include composite materials or may be metal. In some embodiments, the fibers 14 may include composite copolymer and/or composite fibers including polymer fibers or metallic fibers with particles of polymer, metal, and/or fillers embedded therein. Some bi-component fibers may include a fiber core having a higher melting temperature than the fiber coating. Some bi-component fibers may include a fiber core having a lower melting temperature than the fiber coating. Some fibers 14 may be hydrophobic or hydrophilic, and some fibers 14 may include one or more materials that swell.

In some embodiments, a core of the processed assemblages 12b may have a variable density or a variable thickness, and also may have a density gradient defined from the core of the assemblage 12b to an outer surface or side of the assemblage 12b. The pre-processed assemblages 12a may be formed by partially or fully overlaying a plurality of nonwoven slivers. Some processed assemblages 12b may have a width ranging from about two inches to about six inches. In some embodiments, the assemblages 12 may be formed into a predetermined shape, such as a cylinder or a sphere. Some pre-processed assemblages 12a may be generally cylindrical, for example, as shown in FIG. 1, and they may have a length ranging from about one-half inch to about three inches and a diameter ranging from about one-half inch to about two inches. Assemblages having other shapes and sizes are contemplated.

In one example embodiment shown in FIG. 1, the system 10 can include a processing duct 16 including an inlet end 18 configured to receive a plurality of the preprocessed assemblages 12a and an outlet end 20 configured for exit of a plurality of processed assemblages 12b from the processing duct 16. An intermediate portion 22 extends longitudinally between the inlet end 18 and the outlet end 20 of the processing duct 16, and one or more heat inlets 24 can be located in the intermediate portion 22 and facilitate introduction of heat and air flow into the intermediate portion 22. For example, the embodiment shown in FIG. 1 includes two heat inlets 24a and 24b.

The system 10 also can include one or more heating devices 26 coupled to the one or more heat inlets 24. Each of the one or more heating devices 26 is configured to flow heated air into the intermediate portion 22 of the processing duct 16 and heat the plurality of pre-processed assemblages 12a as they are conveyed toward the outlet end 20 of the processing duct 16 to form a plurality of processed assemblages 12b. For example, the embodiment shown in FIG. 1 includes two heating devices 26a and 26b coupled respectively to the heat inlets 24a and 24b of the processing duct 16. Although the example embodiment shown in FIG. 1 includes two heating inlets 24 and two heating devices 26, the system 10 may include fewer than two or more than two heating inlets 24 and/or heating devices 26. More than one heating device 26 may be coupled to a corresponding heat inlet 24, or a single heating device 26 may be coupled to more than one heat inlet 24.

As shown in FIG. 1, the pre-processed assemblages 12a may be supplied to the inlet end 18 of the processing duct 16 via an outlet 28 of an assemblage forming system 30 upstream in production relative to the system 10 for thermally bonding fibers 14 of the assemblages 12. Although the outlet 28 depicted in FIG. 1 is a duct, other forms of outlet are contemplated, such as a rotating wheel or other structure configured to supply the pre-processed assemblages 12a to the system 10. In some embodiments, the inlet end 18 of the processing duct 16 may include a conical-shaped inlet 32 configured to receive the pre-processed assemblages 12a from the outlet 28.

The pre-processed assemblages 12a travel from the inlet end 18 of the processing duct 16 through the intermediate portion 22, during which the pre-processed assemblages 12a are heated, so that at least some of the fibers 14 of the assemblages 12 are thermally bonded to one another as they travel through the processing duct 16. The processed assemblages 12b (i.e., the assemblages 12 for which at least a portion of the fibers 14 have been thermally bonded to one another) exit the processing duct 16 at the outlet end 20, where they are collected in a collection hopper 34, for example, as shown in FIG. 1. Although the example collection hopper 34 shown in FIG. 1 has the form of a receptacle for receiving the processed assemblages 12b, the collection hopper 34 may have other forms, such as an inlet to another production system downstream of the production relative to the system 10.

In some embodiments, after passing the heat inlets 24 and being heated, the heated assemblages 12 may begin to cool while traveling toward the outlet end 20 of the processing duct 16, and processed assemblages 12b, once received in the collection hopper 34, may continue to cool to approach or reach ambient temperature. Once cooled, the thermal bonds between at least a portion of the fibers 14 may set (e.g., physically set and/or chemically set), so that the thermal bonds are maintained following the heating that occurs as the assemblages 12 pass through the processing duct 16.

The example embodiment shown in FIG. 1 also can include an inlet air feed 36 at the inlet end 18 of the processing duct 16. The inlet air feed 36 may be in flow communication with a pressure source 37, such as a compressor and/or a cylinder of compressed air, and may be configured to separate the plurality of pre-processed assemblages 12a from one another upon entry into the inlet end 18 and/or propel the plurality of pre-processed assemblages 12a into the intermediate portion 22 of the processing duct 16. The inlet air feed 36 and/or the one or more heating devices 26 may cause the plurality of assemblages 12 to roll and tumble through the processing duct 16 between the inlet end 18 and the outlet end 20. This may reduce the likelihood or prevent the heated assemblages 12 from adhering to one another and/or an interior surface 38 of the processing duct 16, for example, when fibers 14 of the heated assemblages 12 become tacky or sticky prior to cooling.

The interior surface 38 of the processing duct 16 may have a surface characteristic configured to reduce adherence of the heated assemblages 12 to the interior surface 38. For example, the surface characteristic may include being polished, being surface-treated, and/or being coated. For example, the processing duct 16 may be formed from steel (e.g., stainless steel), and the interior surface 38 may be polished to reduce any surface textures, protrusions, and/or substances that might cause the heated assemblages 12 to adhere to the interior surface 38. In some embodiments, the interior surface 38 may be surface-treated with a substance and/or process configured to reduce the likelihood or prevent the heated assemblages 12 from adhering to the interior surface 38, and/or some embodiments may include a coating and/or plating (e.g., a non-stick plating, such as chrome plating or other known non-stick platings), such as a polytetrafluoroethylene-like coating (or other non-stick coating), that reduces or prevents the heated assemblages 12 from adhering to the interior surface 38.

As shown in FIG. 1, some embodiments of the processing duct 16 may include a plurality of processing duct sections 40 coupled to one another in an end-to-end manner to form the processing duct 16. For example, the processing duct 16 may include an inlet section 40a including the inlet end 18 of the processing duct 16, a heating section 40b including the one or more heat inlets 24, and an extension section 40c including the outlet end 20 of the processing duct 16. Each of the processing duct sections 40 can include a coupler 42 at each end of the respective processing duct section 40, such that the couplers 42 couple the respective processing duct sections 40 to another processing duct section 40 via a complimentary one of the couplers and/or clamps. The couplers 42 may include flanges configured to be coupled to another flange of an adjacent processing duct section 40 via fasteners and/or clamps, such as bolts and/or tri-clover couplers (e.g., a two-hinged, three-part sanitary type connection device that in some examples may be self-aligning and/or self-centering).

The processing duct sections 40 may provide ease of transport, maintenance, or cleaning, and/or may facilitate exchanging one or more of the processing duct sections 40 for another processing duct section 40 having different characteristics, such as to heat assemblages at varying or differing temperatures to provide different assemblage characteristics. The different assemblage characteristics may include different sizes, different shapes, and/or fibers having different characteristics, such as different material types, different deniers, different diameters, and/or different lengths.

For example, a longer inlet section 40a, a heating section 40b having fewer or a greater number of heat inlets 24, and/or an extension section 40c having a shorter or longer length may be exchanged for a corresponding processing section 40 in order to alter or tailor characteristics of the system 10 for thermally bonding assemblages 12 having particular characteristics. This may facilitate changing the length L of the processing duct 16, the length H1 between the inlet end 18 and a first heat inlet 24a (e.g., by changing the inlet section 40a), and/or a length H2 between the first heat inlet 24a and a second heat inlet 24b (e.g., by changing the heating section 40b). The heating section 40b may be exchanged to provide more heat inlets 24 and/or heating devices 26, for example, to process larger assemblages 12 and/or assemblages 12 including fibers 14 having a higher melting temperature.

As shown in FIG. 1, the couplers 42 may be solely on exterior surfaces 44 of the respective processing duct sections 40. By not having coupler structures on the interior surface 38 of the processing duct 16, obstructions of the assemblages 12 passing through the processing duct 16 are avoided.

The processing duct 16 defines a processing duct cross-section, and the processing duct cross-section defines a circular cross-section, a polygonal cross-section, a lobed-cross section, and/or an oval-shaped cross-section. Some embodiments of the processing duct 16 may have a cross-section that has a constant shape and/or a constant cross-sectional area extending the length L of the processing duct 16. For example, the processing duct 16 may have a circular cross-section having a four-inch diameter extending from the inlet end 18 of the processing duct 16 to the outlet end 20 of the processing duct 16. Other embodiments may have a cross-section that differs in size and/or shape at different positions along the length L of the processing duct 16.

As shown in FIG. 1, some embodiments of the system 10 can include a plurality of supports 46 coupled to the processing duct 16 and configured to facilitate adjustment of a pitch angle PD of at least a portion of the processing duct 16 relative to level (e.g., horizontal). The processing duct 16 may define a longitudinal processing duct axis X extending between the inlet end 18 and the outlet end 20 of the processing duct 16, and the pitch angle PD may be defined by the angle of the longitudinal processing duct axis X relative to level (e.g., horizontal). For example, one or more of the supports 46 may include a jack screw and/or an actuator configured to facilitate adjustment of the length of the supports 46, so that the pitch angle PD may be changed. In some embodiments, one or more of the supports 46 may be coupled to a rail or tray positioned between the supports 48 and the processing duct 16 and running at least a portion of the length L of the processing duct 16. The pitch angle PD may be adjusted to cause the assemblages 12 to travel through the processing duct 16 at a greater velocity (e.g., by increasing the pitch angle PD) or a slower velocity (e.g., by reducing the pitch angle PD), for example, depending on the characteristics of the assemblages 12 and/or the desired level of thermal bonding of the fibers 14. The pitch angle PD may range from about zero degrees to about ninety degrees (e.g., from about one degree to about ninety degrees), for example, between about one degree and about fifteen degrees.

In some embodiments, the one or more heating devices 26 can be configured to flow air into the processing duct 16 at a flow rate and a temperature, imparting both a push to the assemblages 12 and an increased temperature to the fibers 14. The inlet air feed 36, the flow rate, the temperature, and/or the pitch angle PD may be adjustable, for example, to process assemblages 12 having different characteristics. For example, the different characteristics may include different mass, different geometry, and/or different material composition. Such different characteristics may render it desirable to change the flow rate of air through the processing duct 16 to increase or decrease the dwell time of the assemblages 12 in the processing duct 16. The flow rate provided by the inlet air feed 36, the flow rate(s) provided by the one or more heating devices 26, and/or the pitch angle PD may be adjusted to increase or decrease the dwell time of the assemblages 12 in the processing duct 16. Greater dwell times may increase the level of thermal bonding of the fibers 14 assemblages 12 relative to a reduced dwell time. The heating temperature(s) provided by the one or more heating devices 26 may be changed to increase or decrease the air temperature to which the assemblages 12 are exposed in while in the processing duct 16. Greater heating temperatures may increase the level of thermal bonding relative to reduced heating temperatures. The combination flow rates and heating temperatures may be tailored to the characteristics of the assemblages 12 and/or the desired level of thermal bonding.

The example embodiment of the system 10 shown in FIG. 1 also includes a cooling system 48 associated with the intermediate portion 22 of the processing duct 16 and configured to cool the interior surface 38 of the processing duct 16, for example, at a portion of the length L of the processing duct 16 adjacent the one or more heating inlets 24. For example, as shown in FIG. 1, the one or more heat inlets 24 are located at the heating section 40b of the processing duct 16, and the cooling system 48 is located at the heating section 40b of the processing duct 16. Cooling the interior surface 38 of the processing duct 16 may reduce the likelihood or prevent the assemblages 12, once exposed to the air heated by the one or more heating devices 26, from adhering to the interior surface 38 of the processing duct 16.

Figure 2B:
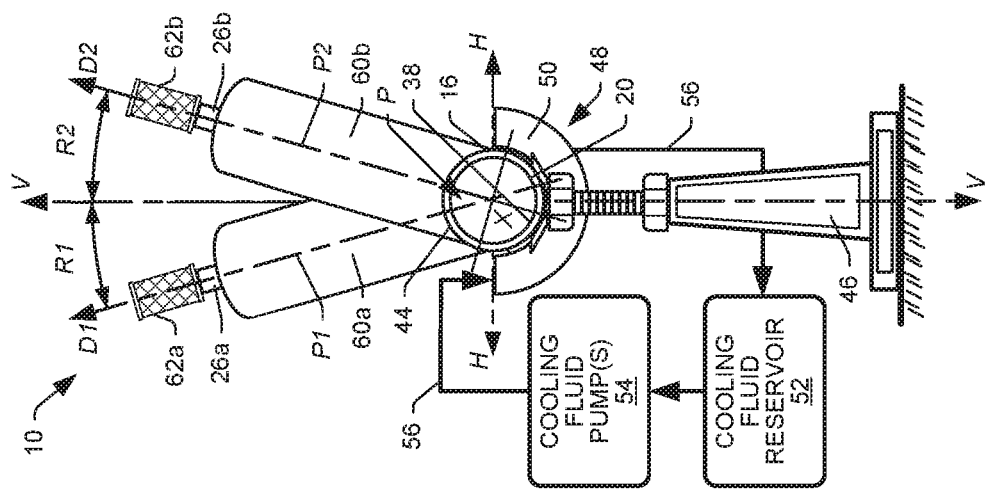
FIG. 2B is an end view of a further example of an embodiment of a system for thermally bonding nonwoven fibers of assemblages according to an aspect of the present disclosure.
Figure 2A:
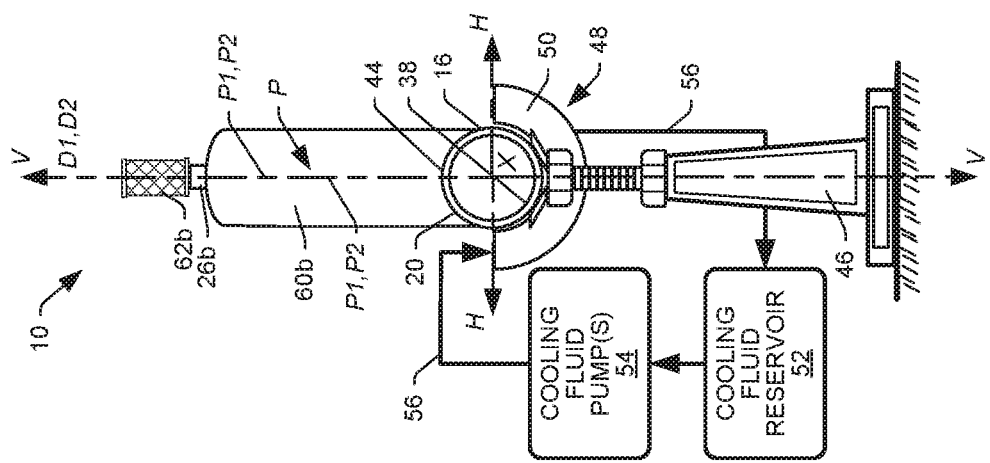
FIG. 2A is an end view of an example embodiment of a system for thermally bonding nonwoven fibers of assemblages according to an aspect of the present disclosure.

As shown in FIGS. 1, 2A, and 2B, the example cooling system 48 is exterior to the processing duct 16 and includes a cooling jacket 50 extending at least partially around the exterior surface 44 of the processing duct 16. In the example shown, the cooling jacket 50 extends about halfway around the exterior surface 44 of the processing duct 16 (see FIGS. 2A and 2B). The cooling system 48 embodiment shown in FIGS. 1, 2A, and 2B also can include a cooling fluid reservoir 52 configured to contain a supply of cooling fluid, one or more pumps 54 configured to pump the cooling fluid, and a fluid conduit 56 coupled to the one or more pumps 54 and the cooling jacket 50. The one or more pumps 54 are configured to circulate cooling fluid from the cooling fluid reservoir 52, through the cooling jacket 50, and to the cooling fluid reservoir 52 via the fluid conduit 56. The cooling fluid may include water and/or coolant (e.g., glycol).

The cooling fluid reservoir 52 may be temperature-controlled, for example, via ice and/or a refrigeration circuit, and the cooling jacket 50 may be enclosed or open-topped. In some embodiments, the cooling jacket 50 may include baffles and/or one or more cooling coils. The cooling jacket 50 may be formed from a material configured to readily transfer heat (provide cooling) to the processing duct 16, such as aluminum, copper, and/or similar materials.

The example embodiment shown in FIG. 1 also includes thermal insulation 58 coupled to the processing duct 16 along the length L of the processing duct 16 between the one or more heat inlets 24 and the outlet end 20. For example, in the thermal insulation 58 can extend at least partially around the exterior surface 44 of the processing duct 16 (e.g., completely around the processing duct 16). The thermal insulation 58 may prevent production personnel from contacting the exterior surface 44 of the processing duct 16, which may be hot, and/or may help retain heat in the interior of the processing duct 16, for example, for providing consistent thermal bonding levels for the assemblages 12 by reducing temperature fluctuations in the extension section 40c of the processing duct 16.

As shown in FIGS. 1, 2A, and 2B, the system 10 also can include one or more heat ducts 60 coupled to the one or more heat inlets 24 and the one or more heating devices 26. The heat ducts 60 provide a flow path for heated air generated by the heating devices 26 into the processing duct 16 via the heat inlets 24. As shown, the one or more heat ducts 60, each define a longitudinal heat duct axis D, and the longitudinal heat duct axes D are oriented at an acute angle A defined by the one or more longitudinal heat duct axes D and the longitudinal processing duct axis X at a corresponding one of the heat inlets 24 and extending in a direction toward the inlet end 18 of the processing duct 16. For example, a first heat duct 60a defines a longitudinal heat duct axis D1, which defines a first acute angle A1, with respect to the longitudinal processing duct axis X, which defines the first acute angle A1, and a second heat duct 60b defines a longitudinal heat duct axis D2, which defines a second acute angle A2 with respect to the longitudinal processing duct axis X The angling of the heat ducts 60 may promote travel of the assemblages 12 toward the outlet end 20 of the processing duct 16 and/or promote swirl of air current down the processing duct 16, which may promote rolling and tumbling of the assemblages 16 as they travel toward the outlet end 20. The acute angles A may range from about 20 degrees to about 70 degrees, from about 30 degrees to about 60 degrees, from about 35 degrees to about 55 degrees, or about 45 degrees.

FIGS. 2A and 2B are end views of example embodiments of the system 10 viewed from the outlet end 20 of the processing duct 16 in the direction of the longitudinal processing duct axis X As shown in FIGS. 2A and 2B, each of the respective longitudinal heat ducts axes D lies in a respective plane P defined by the longitudinal processing duct axis X at a corresponding heat inlet 24 and the respective longitudinal heat duct axes D. As shown in FIG. 2A, the respective planes P may be coplanar in some embodiments. For example, a first plane P1 of the first longitudinal heat duct axis D1 and a second plane P2 of the second longitudinal heat duct axis D2 shown in FIG. 2A are coplanar. In some embodiments, the planes P1 and P2 may be parallel with respect to a vertical axis V and/or perpendicular with respect to a horizontal axis H.

In other embodiments, the respective planes P1 and P2 are not coplanar, for example, as shown FIG. 2B. As shown in FIG. 2B, the respective planes P1 and P2 may intersect and define an angle of intersection R ranging from about 2 degrees to about 170 degrees. For example, the angle of intersection R may range from about 2 degrees to about 90 degrees, from about 2 degrees to about 60 degrees, from about 2 degrees to about 45 degrees, from about 2 degrees to about 30 degrees, from about 2 degrees to about 15 degrees, or from about 5 degrees to about 10 degrees. As shown in FIG. 2B, the first longitudinal heat duct axis D1 may be at a first angle of intersection R1 relative to the vertical axis V, and the second longitudinal heat duct axis D2 may be at a second angle of intersection R2 relative to the vertical axis V. For example, the first angle of intersection R1 and the second angle of intersection R2 may have the same magnitude, but a different direction relative to the vertical axis V. In some embodiments, the first angle of intersection R1 and the second angle of intersection R2 may have different magnitudes and the same or different directions relative to the vertical axis V. Providing the heat ducts 60 at different orientations relative to the vertical axis V may promote swirl of the air flow through the processing duct 16 downstream of the heating devices 26, which may promote rolling and tumbling of the assemblages 12 as they travel toward the outlet end 20 of the processing duct 16.

In some embodiments, the one or more heating devices 26 can be configured to generate a flow of heated air into the processing duct 16 via a corresponding heat inlet 24, and the flow rate of the heated air and/or the temperature of the heated air may be adjustable. For example, the first heating device 26a can be configured to cause a first flow of air into the processing duct 16 at first flow rate and a first temperature, and the second heating device 26b can be configured to cause a second flow of air into the processing duct 16 at second flow rate and a second temperature. In some embodiments, the first flow rate and/or the second flow rate may differ from one another and/or the first temperature and the second temperature may differ from one another. For example, in some embodiments, the first flow rate may be greater than the second flow rate and/or the first temperature may be less than the second temperature. In some embodiments, the second flow rate may be greater than the first flow rate and/or the second temperature may be less than the first temperature. The flow rates and/or the temperatures may be tailored according to the characteristics of the assemblages 12 and/or the level of thermal bonding desired.

As shown in FIGS. 1, 2A, and 2B, the system 10 in some embodiments may include one or more filters 62 associated with or coupled to the one or more heating devices 26 and configured to remove particulates from air entering the processing duct 16 via the one or more heat inlets 24. For example, a first filter 62a may be coupled to an inlet of the first heating device 26a and a second filter 62b may be coupled to an inlet of the second heating device 26b, as shown in FIGS. 1 and 2B. The filters 62 may reduce the likelihood or prevent undesired particulates from adhering to the assemblages 12 as they pass through the processing duct 16, aid in removing contaminants entering the air stream, and/or extend the life of the heating devices 26.

As shown in FIG. 1, some embodiments of the system 10 also can include a recirculation system 64 configured to recirculate heated air extracted from the processing duct 16 downstream of the one or more inlets 24 back to the inlet end 18 of the processing duct 16 (e.g., at the inlet air feed 36) and/or the heating devices 26. The recirculation system 64 may increase the efficiency of the system 10 by reducing the amount of heat that needs to be added to the air by the heating devices 26 to achieve the desired temperature of the air passing through the processing duct 16 downstream of the heat inlets 24.

In the example embodiment shown, the recirculation system 64 includes a recirculation duct 66 providing flow communication between the processing duct 16 downstream of the heat inlets 24 and the heating devices 26 and/or the inlet end 18 of the processing duct 16. The recirculation system 64 also can include a recirculation valve 68 configured permit flow through the recirculation duct 66 in an open condition or prevent flow through the recirculation duct 66 in a closed condition. Although the recirculation duct 66 shown in FIG. 1 is coupled to the downstream end of the heating section 40b of the processing duct 16, in some embodiments, the recirculation duct 66 may be coupled the extension section 40c of the processing duct 16 and provide flow communication from that location of the processing duct 16. In some embodiments, the recirculation duct 66 may be a continuation of the outlet end 20 of the processing duct 16, for example, with the continuation passing back to the intermediate portion 22 and to the heat inlets 24. For example, the outlet end 20 of the processing duct 16 may include an exit opening through which the assemblages 12b pass into collection hopper 34, with the continuation of the outlet end 20 passing back to the heat inlets 24. In some examples, the continuation may include a blower for increasing the velocity of the recirculated air and/or one or more filters for removing particulates and/or contaminates from the recirculated air.

In the example embodiment shown in FIG. 1, the recirculation duct 66 provides flow communication with inlets of the one or more filters 62, and the filters 62 may prevent particulates (e.g., fibers 14 that have detached from the assemblages 12 loose in the processing duct 16) from entering the processing duct 16 via the recirculation system 64. The recirculation duct 66, in some embodiments, also can provide flow communication upstream relative the heat inlets 24, as shown in FIG. 1, and some embodiments of the system 12 may include a filter coupled to the processing duct 16 at the point at which the recirculation duct 66 provides flow communication to the inlet section 40a of the processing duct 16.

The example embodiment shown in FIG. 1 also can include a plurality of sensors configured to generate signals indicative of conditions associated with operation of the system 10. The sensors may render it relatively easier for an operator of the system 10 to adjust one or more of the supports 46 to adjust the pitch angle PD, the inlet air feed 36, the heating devices 26, the cooling system 48, and/or the recirculation system 64 to achieve a desired level of thermal bonding of the assemblages 12. In one aspect, the signals may be received by a control panel in communication with the system 10 via a hard-wired communications link and/or a wireless communications link connection, and an operator may adjust one or more of the of the supports 46 to adjust the pitch angle PD, the inlet air feed 36, the heating devices 26, the cooling system 48, and/or the recirculation system 64 to achieve a desired level of thermal bonding of the assemblages 12. The control panel may be located at the site or building at which the processing duct 16 is located and/or at a site remote therefrom.

As shown in FIG. 1, the system 10 can include one or more ambient sensors 70 configured to generate signals indicative of the ambient temperature, ambient humidity, and/or ambient pressure where the system 10 is being operated. The system 10 also can include one or more processing duct sensors 72 configured to generate one or more signals indicative of a temperature inside the processing duct 16 at the location of the respective processing duct sensor 72, a flow rate inside the processing duct 16 at the location of the respective processing duct sensor 72, and/or pressure inside the processing duct 16 at the location of the respective processing duct sensor 72. The system 10 also can include one or more cooling fluid sensors 74 configured to generate one or more signals indicative of a temperature inside the cooling system 48, the cooling jacket 50, the cooling fluid reservoir 52, and/or fluid conduit 56 at the location of the respective sensor 74. In the embodiment shown in FIG. 1, the system 10 also includes one or more recirculation sensors 76 configured to generate one or more signals indicative of a temperature inside the recirculation duct 66 at the location of the respective recirculation sensor 76, a flow rate inside the recirculation duct 66 at the location of the respective recirculation sensor 76, and/or pressure inside the processing duct 16 at the location of the respective recirculation sensor 76. The example embodiments shown also include one or more post-processing sensors 78 configured to generate one or more signals indicative of the level of thermal bonding of the processed assemblages 12b upon exit from the outlet end 20 of the processing duct 16, as explained in more detail below. An operator may use one or more of the signals from the sensors 70, 72, 74, 76, and/or 78 to adjust operation of the system 10 to obtain a desired level of thermal bonding of the processed assemblages 12b.

Figure 3:
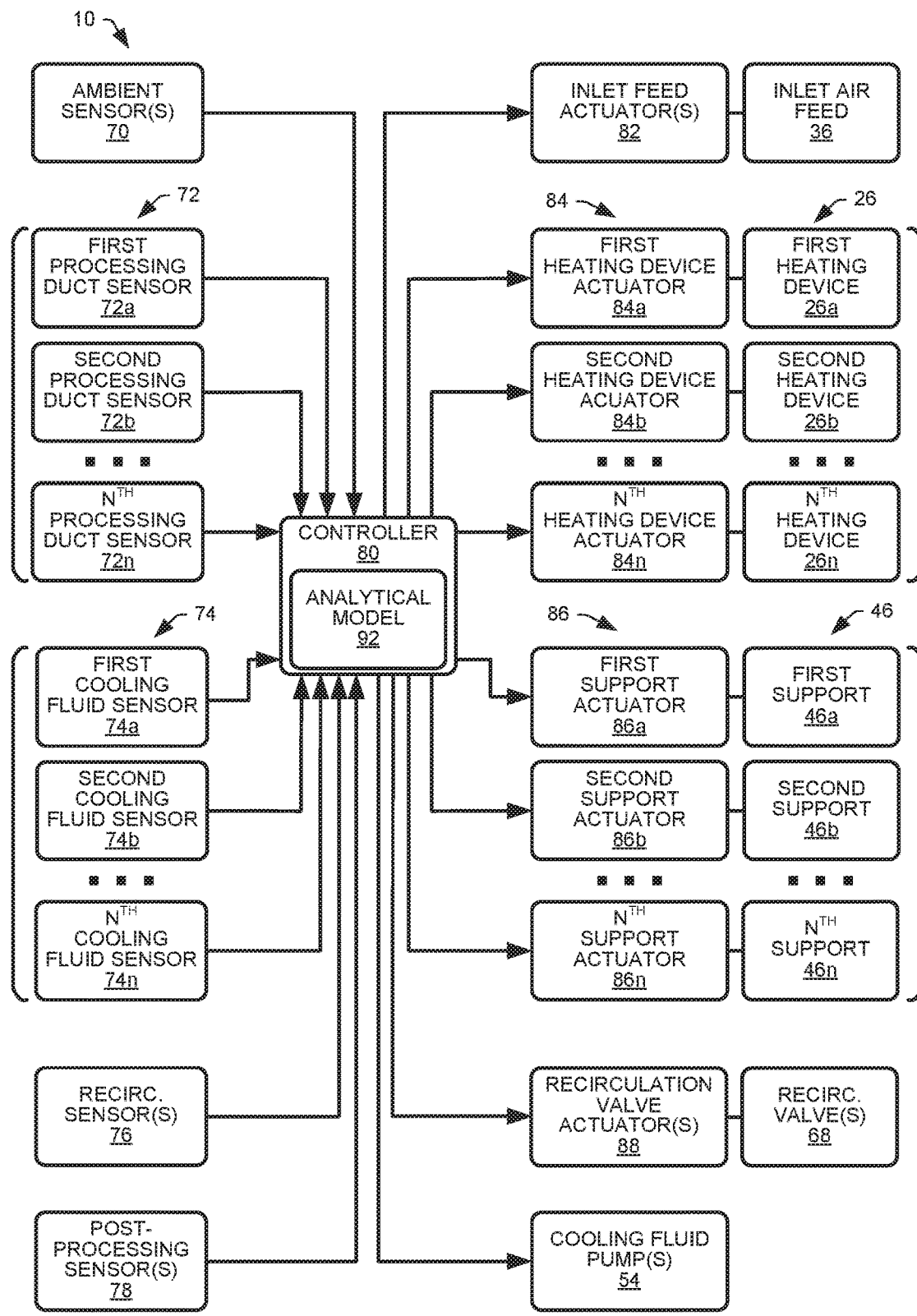
FIG. 3 a block diagram of another example embodiment of a system for thermally bonding nonwoven fibers of assemblages, including an example controller for semi- or fully-autonomously thermally bonding the nonwoven fibers.

FIG. 3 is a block diagram of an example embodiment of the system 10 for thermally bonding nonwoven fibers 14 of assemblages 12, including an example controller 80 for semi- or fully-autonomously controlling thermal bonding of the fibers 14 of the assemblages 12. For example, the controller 80 may be in communication with the ambient sensors 70, the processing duct sensors 72, the cooling fluid sensors 74, the recirculation sensors 76, and/or the post-processing sensors 78, receive the one or more signals from the sensors, and, based at least in part on the one or more signals, control operation of at least one of the inlet air feed 36, the one or more heating devices 26, the cooling system 48 (e.g., operation of the one or more pumps 54), or the recirculation system 64 (e.g., operation of the recirculation valve 68) to achieve a desired level of thermal bonding of the assemblages 12. In some embodiments, the controller 80, based at least in part on signals from the sensors, also can control the height of one or more of the supports 46 to adjust the pitch angle PD of the processing duct 16 to achieve the desired level of thermal bonding.

As shown in FIG. 3, in some example embodiments of the system 10 the processing duct sensors 72 may include a first processing duct sensor 72a and a second processing duct sensor 72b through an nth processing duct sensor 72n. The cooling fluid sensors 74 may include a first cooling fluid sensor 74a and a second cooling fluid sensor 74b through an nth cooling fluid sensor 74n, and the one or more recirculation sensors 76 may include a plurality of recirculation sensors 76 positioned at various points of the recirculation system 64.

As shown in FIG. 3, some embodiments of the system 10 may include one or more inlet actuators 82 coupled to the inlet air feed 36 and configured to change the flow rate and/or pressure of air entering the processing duct 16 at the inlet end 18. The one or more inlet actuators 82 may include pneumatic, hydraulic, and/or electric actuators configured to adjust the flow rate and/or pressure of air entering the processing duct 16 at the inlet end 18. The system 10 also can include at least one heating device actuator 84 coupled to the one or more heating devices 26 and configured to change the flow rate of the heated air, the pressure of the heated air, and/or a temperature of the heated air entering the processing duct 16 at the one or more heat inlets 24. For example, the heating device actuators 84 may include a first heating device actuator 84a and a second heating device actuator 84b through an nth heating device actuator 84n coupled to respective heating devices 26a and 26b through 26n. The one or more heating device actuators 84 may include pneumatic, hydraulic, and/or electric actuators configured to adjust the flow rate, the pressure, and/or a temperature of the heated air entering the processing duct 16.

The example embodiment shown in FIG. 3 also includes at least one support actuator 86 coupled to the one or more supports 46 and configured to change the length of the respective support 46 to adjust the pitch angle PD of the processing duct 16. For example, the support actuators 86 may include a first support actuator 86a and a second support actuator 86b through an nth support actuator 86n coupled to respective supports 46a and 46b through 46n. The one or more support actuators 86 may include pneumatic, hydraulic, and/or electric actuators configured to adjust the length of the supports 46. For example, one of more of the supports 46 may include a jack screw configured to change the length of the support 46, and the support actuators 86 may include motors configured to turn the jack screw.

The system 10 also includes one or more recirculation valve actuators 88 coupled to the one or more recirculation valves 68 and configured to open, close, or partially open or close, the one or more recirculation valves 68 to control operation of the recirculation system 64. The one or more recirculation valves 68 may include a metering valve configured to partially open or close, for example, to meter the amount of extracted heated air flowing through the recirculation system 64. The one or more recirculation valve actuators 88 may be pneumatic, hydraulic, and/or electric actuators.

In the example embodiment shown in FIG. 3, the controller 80 may be configured to control operation of the inlet air feed 36, the heating devices 26, the cooling system 48, and/or the recirculation system 64 by causing the inlet actuator(s) 82, the heating device actuators 84, and/or the recirculation valve actuator(s) 88 to alter operation of one or more of the inlet air feed 36, the heating devices 26, and/or the recirculation valves 68, respectively. The controller 80, in some embodiments, also can be configured to control operation of the one or more cooling fluid pump(s) 54 and/or operation of one or more of the support actuators 86 to change the pitch angle PD of the processing duct 16.

As shown in FIGS. 1 and 3, the system 10 also can include one or more post-processing sensors 78 configured generate one of more signals indicative of a level of adherence of at least some of the plurality of fibers 14 to one another of the processed assemblages 12b. For example, the controller 80 may receive the one or more signals generated by the post-processing sensor(s) 78 and, based at least in part on the one or more signals, control operation of at least one of the inlet air feed 36, the heating devices 26, the cooling system 48, the recirculation system 64, the one or more cooling fluid pump(s) 54, and/or the one or more of the support actuators 86.

The one or more post-processing sensors 78 may include an imager configured to capture one or more images of the plurality of processed assemblages 12b, a size sensor configured to generate one or more signals indicative of a size of the plurality of processed assemblages 12b (e.g., an imager, LIDAR, RADAR, and/or SONAR), and/or a temperature sensor (e.g., an infra-red imager) configured to generate one of more signals indicative of a temperature associated with the plurality of processed assemblages 12b. For example, as shown in FIG. 1, the one or more post-processing sensors 78 may be mounted to a support 90 and aimed or otherwise directed toward the processed assemblages 12b as they exit the outlet end 20 of the processing duct 16.

The one or more signals from the post-processing sensor(s) 78 may be used by an operator of the system 10 to manually adjust operation of the inlet air feed 36, the heating devices 26, the cooling system 48, the recirculation system 64, the one or more cooling fluid pump(s) 54, and/or the one or more of the support actuators 86 to achieve a desired level of adherence of the fibers 14 of the processed assemblages 12b.

In some embodiments of the system 10, the controller 80 may be configured to execute or run an analytical model 92 and adjust operation of the system 10 as explained above based on an output of the analytical model 92. For example, the controller 80 may be configured to semi- or fully-autonomously operate the system 10 to achieve processed assemblages 12b having a desired level of adherence of the fibers 14 to one another. In some embodiments, the analytical model 92 may be empirically-derived based on observed performance of the system 10 over time, while in other embodiments, the analytical model 92 may include a machine learning-trained model. For example, a machine-learning trained model may be trained using historically-captured data sets correlating the assemblage type desired, the level of adherence of the fibers 14 of the processed assemblage 12b to one another, signals from the ambient sensor(s) 70, signals from the processing duct sensors 72, signals form the cooling fluid sensors 74, and/or signals from the recirculation sensors 76 to signals from the post-processing sensor(s) 78. As the system 10 continues to operate over time, more of such data can be collected and used to update the machine-learning trained model, such that over time the accuracy of the analytical model 92 improves.

A machine learning engine may be used to train the analytical model 92, and the machine learning engine may employ one or more algorithms, such as supervised learning algorithms (e.g., artificial neural networks, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

The controller 80 can include one or more industrial control systems (ICS), such as supervisory control and data acquisition (SCADA) systems, distributed control systems (DCS), and/or programmable logic controllers (PLCs). For example, the controller 80 may include one or more processors, which may operate to perform a variety of functions, as set forth herein. In some examples, the processor(s) may include a central processing unit (CPU), a graphics processing unit (GPU), both CPU and GPU, or other processing units or components. Additionally, at least some of the processor(s) may possess local memory, which also may store program modules, program data, and/or one or more operating systems. The processor(s) may interact with, or include, computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may be configured to store computer-executable instructions, which when executed by a computer, perform various operations associated with the processor(s) to perform the operations described herein.

Example embodiments of the controller 80 may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A system for thermally bonding fibers of a plurality of assemblages, each assemblage initially comprising a plurality of nonwoven fibers loosely held together in the assemblage, the system comprising:
a processing duct comprising:
an inlet end configured to receive unprocessed assemblages;
an outlet end configured for exit of processed assemblages from the processing duct;
an intermediate portion extending longitudinally between the inlet end and the outlet end; and
one or more heat inlets located along the intermediate portion and configured to facilitate introduction of heat and air flow into the intermediate portion;
a cooling system associated with the intermediate portion of the processing duct and configured to cool an interior surface of the processing duct;
an inlet air feed at the inlet end of the processing duct, the inlet air feed configured to separate the unprocessed assemblages from one another upon entry into the processing duct and propel the unprocessed assemblages through the inlet end and into the intermediate portion of the processing duct; and
one or more heaters coupled to the one or more heat inlets of the processing duct, each of the heaters configured to generate and direct a flow of heated air into the intermediate portion of the processing duct;
wherein the unprocessed assemblages are heated as they are conveyed through the intermediate portion of the processing duct and toward the outlet end of the processing duct to form the plurality of processed assemblages, each of the processed assemblages including the plurality of nonwoven fibers, with at least some of the plurality of nonwoven fibers adhered to one another.

2. The system of claim 1, wherein one or more of the inlet air feeds introduced into the intermediate portion of the processing duct by the one or more heaters is introduced at a velocity or flow rate sufficient to cause the unprocessed assemblages to roll and tumble as they move through the processing duct.

3. The system of claim 1, further including a plurality of supports coupled to the processing duct and configured to facilitate adjustment of a pitch angle of at least a portion of the processing duct relative to level.

4. The system of claim 3, wherein:
the one or more heaters are configured to direct air flows into the processing duct at a selected flow rate and at a selected a temperature; and
at least one of a volume of the inlet air feed, the flow rate of the air flows from the one or more heaters, the temperature of the air flows, and/or the pitch angle is adjustable to adjust and/or provide the processed assemblages with different characteristics.

5. The system of claim 4, wherein the different characteristics include at least one of different mass, different geometry, or different material composition.

6. The system of claim 1, wherein the one or more heat inlets are located at a heating section of the processing duct; and the cooling system is located at the heating section of the processing duct.

7. The system of claim 1, wherein the cooling system comprises:
a cooling jacket extending at least partially around an exterior surface of the processing duct;
a cooling fluid reservoir configured to contain a supply of cooling fluid;
one or more pumps configured to pump cooling fluid; and
a fluid conduit coupled to the one or more pumps and the cooling jacket,
wherein the one or more pumps are configured to circulate cooling fluid from the cooling fluid reservoir, through the cooling jacket, and to the cooling fluid reservoir via at least a portion of the fluid conduit.

8. The system of claim 1, further comprising a filter associated with the one or more heaters and configured to remove particulates from air entering the processing duct via the one or more heat inlets.

9. The system of claim 1, further comprising thermal insulation coupled to the processing duct along a length of the processing duct between the one or more heat inlets and the outlet end.

10. The system of claim 1, further comprising one or more heat ducts coupled to the one or more heat inlets and the one or more heaters, the one or more heat ducts configured to provide a flow path for the heated air into the processing duct.

11. The system of claim 10, wherein one or more of the heat ducts defines a longitudinal heat duct axis, and wherein one or more of the longitudinal heat duct axes is oriented at an acute angle defined by the one or more longitudinal heat duct axes and a longitudinal processing duct axis at a corresponding heat inlet, the longitudinal processing duct axis extending in a direction toward the inlet end of the processing duct.

12. The system of claim 1, wherein the processing duct defines an interior surface, at least a portion of the interior surface including at least one surface characteristic configured to reduce adherence of assemblages to the interior surface.

13. The system of claim 1, further comprising a recirculation system in flow communication with:
the processing duct downstream of the one or more heaters; and
the one or more heaters,
wherein the recirculation system is configured to recirculate heated air extracted from the processing duct to one or more of the inlet air feed or inlets of the one or more heaters.

14. The system of claim 1, further comprising:
one or more sensors configured to generate one or more signals indicative of a temperature inside the processing duct, a flow rate inside the processing duct, a pressure inside the processing duct, or combinations thereof; and
a controller in communication with the one or more sensors and configured to: receive the one or more signals; and
based at least in part on the one or more signals, control operation of at least one of the inlet air feed or the one or more heaters.

* * * * *